United States Patent [19]

Mitsuuchi et al.

[11] Patent Number: 5,212,222

[45] Date of Patent: May 18, 1993

[54] MELT-STABLE RECYCLABLE CARBON BLACK-LADEN POLYACETAL RESIN MOLDING COMPOSITIONS AND MOLDED ARTICLES FORMED OF THE SAME

[75] Inventors: Masamichi Mitsuuchi; Tsuyoshi Minamisawa; Hiroshi Kitamura; Hideo Kakizaki, all of Shizuoka, Japan

[73] Assignee: Polyplastics Co., Ltd., Osaka, Japan

[21] Appl. No.: 827,047

[22] Filed: Jan. 29, 1992

[30] Foreign Application Priority Data

Feb. 4, 1991 [JP] Japan .................................. 3-13480

[51] Int. Cl.⁵ .............................................. C08K 13/06
[52] U.S. Cl. .................................... 524/230; 523/204; 523/210; 523/215; 524/291; 524/495; 524/496; 524/493
[58] Field of Search ............... 524/291, 230, 495, 496, 524/593; 523/204, 210, 215

[56] References Cited

U.S. PATENT DOCUMENTS

| | | | |
|---|---|---|---|
| 3,442,850 | 5/1969 | O'Brien et al. | 524/593 |
| 3,484,399 | 12/1969 | Kakos | 524/593 |
| 4,379,871 | 4/1983 | Werle et al. | 524/495 |
| 4,391,741 | 7/1983 | Masamoto et al. | 252/511 |
| 4,564,647 | 1/1986 | Hayashi et al. | 523/215 |
| 4,670,508 | 6/1987 | Ohdaira et al. | 524/495 |
| 5,086,095 | 2/1992 | Katsumata et al. | 524/495 |

FOREIGN PATENT DOCUMENTS 2292746 11/1988 European Pat. Off. .
2808675 9/1978 Fed. Rep. of Germany .
1060497 3/1967 United Kingdom .

OTHER PUBLICATIONS

World Patents Index, Wee 2579, Derwent Publications Ltd., London, GB; AN 76-87888X & JP-8-54 013 269 (Asahi Chem Ind. KK) May 29, 1979.

*Primary Examiner*—Veronica P. Hoke
*Attorney, Agent, or Firm*—Nixon & Vanderhye

[57] ABSTRACT

Melt-stable polyacetal molding compositions include a polyacetal base resin, and a carbon black-impregnated ethylenic carrier polymer in amounts to yield between about 0.1 to 30 parts by weight of carbon black. The ethylenic carrier polymer is preferably present in an amount between 0.3 to 8 times by weight of the carbon black impregnated therewithin. The compositions of this invention further contain a co-stabilization package which includes a first stabilizer selected from nitrogen-containing compounds, fatty acid ester compounds, and metal-containing compounds which contain a hydroxide, an inorganic acid salt or a carboxylic acid salt of an alkali metal or an alkaline earth metal, and a second stabilizer which is a hindered phenolic compound. Preferably, the first and second stabilizers are each used in amounts between 0.01 to 5 parts by weight, based on 100 parts by weight of the polyacetal base resin.

12 Claims, No Drawings

MELT-STABLE RECYCLABLE CARBON BLACK-LADEN POLYACETAL RESIN MOLDING COMPOSITIONS AND MOLDED ARTICLES FORMED OF THE SAME

FIELD OF INVENTION

This invention generally relates to polyacetal molding compositions. More specifically, this invention relates to melt-stable polyacetal molding compositions which contain significant amounts of carbon black. The compositions of this invention are especially characterized by reduced formaldehyde gas evolution and mold deposit formation due to increased melt-stability, and can be recycled without detrimental effects on the heat stability and/or other properties attributable to polyacetal resins generally.

BACKGROUND AND SUMMARY OF THE INVENTION

As is well known, polyacetal resins have been used extensively in various fields as an engineering plastics material due to the excellent physical properties (such as mechanical and electrical properties) and chemical properties (such as chemical resistance and heat-resistance properties) that such resins possess. As a result, polyacetal resins have been used as a material to form component parts of electric and electronic apparatus, automobiles, precision instruments, building materials (e.g., pipes) and the like.

Notwithstanding the excellent inherent properties exhibited by polyacetal resins generally, there is still a need for continual improvements to be made in this regard, especially as new and/or more specialized end-use applications for polyacetal resins are identified. For example, attempts to improve the weather resistance and/or electrical conductivity properties of polyacetal resins have included incorporating (e.g., via melt-blending) carbon black within a polyacetal base resin. Incorporation of carbon black within a polyacetal base resin, however, has several disadvantages.

In this connection, the presence of carbon black in polyacetal resin results in a decrease in the heat stability of the composition. For this reason, when relatively large amounts of carbon black are incorporated into polyacetal resin (e.g., to impart improved weather resistance and/or electrical conductivity properties) during production of a carbon black-laden master batch, the polyacetal resin can be degraded to an extent that significant free formaldehyde gas is released into the ambient environment. The evolution of formaldehyde gas in the workplace is, of course, to be avoided. Furthermore, incorporation of meaningful amounts of carbon black in polyacetal resin will typically result in tarry substances being deposited on mold cavity walls when the carbon black-laden polyacetal resin is subjected to molding operations. Thus, over prolonged time periods, these mold deposits will build up to an extent that affects the quality of the resulting molded articles requiring costly equipment down time to allow for cleaning There is also an increased demand for plastics to be recycled (for example, scrap materials, such as sprues, runners and the like, which result during molding of useful articles/components). This increased demand for "recyclable" plastics has occurred not only as a result of a desire to economize resources and reduce ecological waste, but also to reduce raw material costs for manufacturers of plastics articles. However, recycling plastics materials, especially polyacetal, further deteriorates the heat stability and other mechanical properties of the resin.

It has also been proposed to incorporate various heat-stabilizers, such as phenolic, amine or urea stabilizers, into polyacetal resin as a means to increase its heat-stability properties, particularly during molding. Although incorporation of such stabilizers does impart some improvements to the heat-stability properties of polyacetal resin, especially polyacetal resins which additionally include carbon black, further improvements are still needed. It is towards fulfilling such needs that the present invention is directed.

Broadly, the present invention is directed to recyclable carbon black-laden polyacetal resin compositions which exhibit improved melt-stability. More particularly, the present invention is directed to polyacetal molding compositions which include a normally solid polyacetal base resin, and between about 0.1 to 30 parts by weight of carbon black homogeneously dispersed throughout the polyacetal base resin in an ethylenic carrier resin. Preferably, the ethylenic carrier resin is present in an amount between 0.3 to 8 times the amount by weight of the carbon black.

The compositions of this invention are also especially characterized by the presence of a co-stabilization package which includes (1) a first stabilizer which is selected from nitrogen-containing compounds, fatty acid ester compounds, and metal-containing compounds which include a hydroxide, an inorganic acid salt or a carboxylic acid salt of an alkali metal or an alkaline earth metal, and (2) a second stabilizer which is a hindered phenolic compound.

Further aspects and advantages of this invention will become more clear after careful consideration is given to the following detailed description of the preferred exemplary embodiments.

DETAILED DESCRIPTION OF THE PREFERRED EXEMPLARY EMBODIMENTS

The polyacetal base resin that may be used in the compositions of the present invention is a high-molecular weight polymer comprised of repeating oxymethylene units ($-CH_2O-$) which may be selected from among polyoxymethylene homopolymers, copolymers (including block copolymers) and terpolymers comprising oxymethylene units and a minor amount of other constituent units. These polymers may, moreover, be linear, branched or crosslinked.

The preferred homopolymer is generally prepared by the polymerization of anhydrous formaldehyde or a cyclic trimer thereof, i.e., trioxane. Generally, the homopolymer is stabilized against thermal decomposition by end-capping with a suitable moiety having greater stability as compared to the oxymethylene units. The preferred copolymer on the other hand is a high-molecular weight polymer comprising between about 85 to 99.9% of repeating oxymethylene units randomly interspersed with higher oxyalkylene units (e.g., having two or more adjacent carbon atoms).

The carbon black component that is used in the compositions of this invention is not particularly limited. Thus, virtually any carbon black produced by furnace, channel and acetylene processes may be used. The compositions of this invention are especially characterized by the fact that carbon black is not in and of itself used. Instead, the carbon black is integrated within an ethylenic carrier polymer and it is this carbon black-laden ethylenic carrier polymer that is homogeneously dispersed throughout the polyacetal base resin (thereby concurrently dispensing the carbon black integrated therewithin throughout the polyacetal base resin).

The ethylenic carrier polymer that is used for the purposes of the present invention is preferably one which is compatible with the polyacetal base resin so that its deterioration and/or decomposition during extrusion or molding is less likely. Furthermore, compatibility between the ethylenic carrier polymer and the polyacetal base resin serves to prevent peeling or delamination of the resin components in the composition, for example, when the composition is used to mold articles having relatively thin walls and/or complex shapes.

Examples of preferred ethylenic polymers include low-density polyethylene, high-density polyethylene, ethylene-vinyl acetate copolymers, ethylene-acrylic ester copolymers, ethylene-α-olefin copolymers, modified ethylene copolymers (such as graft or block copolymers mainly composed of the above-described (co)-polymers), and polyethylene wax. Although these ethylenic polymers may be used alone or in the form of a mixture of two or more of the same, polyethylene, such as low-density polyethylene and/or high-density polyethylene, is preferably used from the viewpoint of the heat stability, cost, and the like.

The integration of the carbon black within the ethylenic carbon resin may be accomplished by dry blending, masterbatching or the like. For example, predetermined amounts of carbon black and ethylenic polymer may sufficiently be mixed and kneaded with each other under agitation by means of a kneader, a Banbury mixer, a mixing roll, an extruder or the like until the carbon black integration within the ethylenic carrier polymer is attained. The resulting kneaded integrated product will thus comprise the ethylenic polymer within which the carbon black is homogeneously dispersed (integrated). The kneaded integrated product may be in any desired form, for example, powder, pellet, and like forms.

During the carbon black integration process, various other additives, such as dyes and pigments (other than carbon black) antioxidants and lubricants, may also be incorporated into the ethylenic carrier polymer in suitable amounts.

The amount of the ethylenic polymer used in the above-described integration process is typically about 0.3 to 8 times by weight, preferably between 0.5 to 5 times by weight and most preferably between 0.7 to 2 times by weight of the carbon black. Kneading difficulties are encountered when the amount of the carrier polymer is less than 0.3 times by weight of the carbon black. On the other hand, when the amount of the carrier polymer exceeds 8 times by weight of the carbon black, unfavorable phenomena, such as property deterioration of the polyacetal base resin and/or peeling due to poor dispersion of the ethylenic carrier polymer tend to occur.

Although the amount of carbon black integrated ethylenic carrier polymer varies somewhat depending upon the end use applications and purposes of the composition, it is preferred that sufficient amounts be blended with the polyacetal base resin to obtain between 0.1 to 30 parts by weight, and preferably between 0.5 to 20 parts by weight, of carbon black per 100 parts by weight of the polyacetal base resin. When the carbon black is used in high concentrations for the production of a colored master batch or the like, it is most preferably present in an amount between 3 to 15 parts by weight. When the amount of carbon black is less than 0.1 parts by weight, little (if any) improvements in weather resistance can be attained. On the other hand, when the amount of carbon black exceeds 30 parts by weight, the inherent desirable properties of the polyacetal base resin are unfavorably affected.

As mentioned previously, the present invetnion is further characterized by the use of a co-stabilization package—i.e., a stabilization "system" that employs at least two stabilizers. In this connection, the first stabilizer will be selected from among nitrogen-containing compounds, fatty acid ester compounds and metal-containing compounds having a hydroxide moiety, inorganic acid salts or carboxylic acid salts of an alkali metal or an alkaline earth metal.

Specific examples of nitrogen-containing compounds include homopolyamides and copolyamides, such as nylon 12, nylon 6.10 and nylon 6.66.610, substituted polyamides having a methylol group or the like, polyamides such as polyester amides synthesized from a nylon salt and caprolactam or from a combination of caprolactone with caprolactam, thermal condensation products synthesized by heating from polyaminotriazole, dicarboxylic acid dihydrazide and urea, nitrogen-containing condensation polymers synthesized from urea and a diamine, thermal condensation products of urea prepared by heating urea, a uracil, cyanoguanidine, dicyandiamide, guanamine(2,4-diamino-sym-triazine), N-butylmelamine, N-phenylmelamine, N,N-diphenylmelamine, N,N-diallylmelamine, N,N'N'-triphenylmelamine, N,N'N''-trimethylolmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine (amellide), 2-oxy-4,6-diamino-sym-triazine (ammeline) and N,N,N',N'-tetracyanoethyl-benzoguanamine. Specific examples of the dicarboxylic acid dihydrazide include oxalic hydrazide, adipic hydrazide, sebacic hydrazide and dicarboxylic acid dihydrazides represented by the following general formulas (I) to (III):

[I]

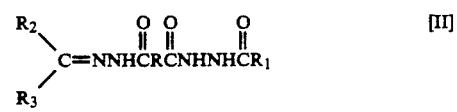

[II]

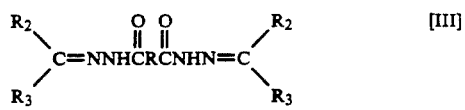

[III]

wherein R represents a group having 10 or more carbon atoms selected from among branched alkylene groups, straight-chain alkylene groups substituted with a phenyl group or —CO—$R_1$ wherein $R_1$ represents a methoxy group or —NHNH—CO—$R_1$ a straight-chain or branched alkylene group and a straight-chain or branched alkadienylene group, and $R_1$, $R_2$ and $R_3$, which may be the same or different, each represent a hydrogen atom, a lower alkyl group, a dodecylthioethyl group, a (3,5-di-tert-butyl-4-hydroxyphenyl)ethyl group, a phenyl group, a tert-butylphenyl group, a 2-hydroxyphenyl group, a 3,5-di-tert-butyl-4-hydroxyphenyl group or a 2-pyrrolidon-5-yl group.

Examples of the branched alkylene group represented by R in the above-described general formulas (I) to (III) include 1,6-decanediyl, 6-ethyl-1,12-dodecanediyl, 6-ethyl-1,16-hexadecanediyl and 7,11-dimethyloctadecane-1,8-diyl. Examples of the straight-chain alkylene group substituted with a phenyl group represented by R include 7,8-diphenyl-1,14-tetradecanediyl, 6,8-diphenyl-1,14-tetradecanediyl and 7-phenyl-1,13-tridecanediyl, while examples of the straight-chain alkylene group substituted with —CO—$R_4$ represented by 12 include 6-8-bis(—CO—$R_4$)-1,14-tetradecanediyl and 6, 7, 8, 9-tetra(—CO—$R_4$)-1,4-tetradecanediyl.

Examples of the lower alkyl group represented by the $R_1$ to $R_3$ include methyl, ethyl, propyl, isopropyl, butyl, isobutyl and tert-butyl.

The nitrogen-containing compound is preferably at least one member selected from among melamine and its derivatives and dicarboxylic acid dihydrazides, and preferably melamine and/or dicarboxylic acid dihydrazide.

The fatty acid ester compound that may be used in the compositions of the present invention is one derived from at least one saturated or unsaturated fatty acid having 12 to 32 carbon atoms and a polyhydric alcohol such as glycerol, diglycerol, pentaerythritol, sorbitan or ethylene glycol. Examples of the fatty acid that may be used to prepare the fatty acid ester compound include lauric acid, tridecylic acid, myristic acid, pentadecylic acid, palmitic acid, stearic acid, nonadecylic acid, behenic acid, naturally occurring fatty acids containing the above-described fatty acids, and mixtures thereof.

Among the fatty acid ester compounds, a fatty acid ester derived from a fatty acid selected from among palmitic acid, stearic acid and behenic acid and a polyhydric alcohol selected from glycerol and sorbitan are preferred. Preferred examples of the fatty acid ester compound include glycerin monostearate, glycerin distearate, glycerin monobehenate, sorbitan monostearate and sorbitan monobehenate.

The metal-containing compound comprising a hydroxide moiety, an organic acid salt or a carboxylic acid salt of an alkali or alkaline earth metal will now be described. In this regard, specific examples of the alkali metal incude lithium, sodium and potassium, and examples of the alkaline earth metal include magnesium, calcium and barium. Examples of the inorganic acid salt include salts of carbonic acid, phosphoric acid and silicic acid, and examples of the carboxylic acid salt include salts of oxalic acid, malonic acid, succinic acid and higher ($C_{12-32}$) fatty acids, such as stearic acid ar behenic acid, and substituted higher fatty acids having a substituent such as a hydroxyl group. A hydroxide, a carbonic acid salt and a carboxylic acid salt of calcium, magnesium and lithium are preferred, and a carboxylic acid salt is even more preferred. Particularly preferred examples of the metal-containing carboxylic acid salt include calcium stearate, calcium 12-hydroxystearate and calcium behenate.

The compounds described above in relation to the first stabilizer may be used alone or in a combination of two or more of the same. Among others, a combination of a nitrogen-containing compound with a fatty acid ester compound and/or a metal-containing compound is especially preferred. Particularly preferred examples of a combination of compounds as the first stabilizer include a combination of at least one member selected from melamine and dicarboxylic acid hydrazide with a member selected from glycerin monostearate, glycerin distearate, glycerin monobehenate, sorbitan monostearate and/or a calcium salt of stearic acid or behenic acid.

The amount of incorporation of the first stabilizer component in the compositions of the present invention is in the range between 0.01 to 5 parts by weight, preferably between 0.03 to 2 parts by weight, and most preferably between 0.05 to 1.0 part by weight based on 100 parts by weight of the polyacetal base resin. When the amount of the first stabilizer component is less than 0.01 part by weight, little (if any) improvements in heat stability can be attained. On the other hand, when the amount of the first stabilizer component exceeds 5 parts by weight, deposits of the first stabilizer component are likely to form on the surface of the composition and/or on molded articles formed thereof.

The incorporation of the first stabilizer component in combination with a hindered phenolic compound as the second stabilizer in a polyacetal base resin containing the carbon black integrated ethylenic carrier resin is a contributing factor to inhibiting decomposition of the polyacetal base resin, while at the same time serves to capture any free formaldehyde generated by polyacetal decomposition. As a result, the generation of formaldehyde decomposition gas as well as the formation of mold deposits during molding are minimized.

Specific examples of the hindered phenolic compound that may be used as the second stabilizer in the compositions of the present invention include 2,2'-methylenebis(4-methyl-6-tert-butylphenol), 1,6-hexanediol bis[3-(3,5-di-tert-butyl-4-hydroxyphenyl)-propionate], pentaerythrityl tetrakis[3-(3,5-di-tert-butyl-4-hydroxyphenyl) propionate], triethylene glycol bis-[3-(3-tert-butyl-5-methyl-4-hydroxypheny)-propionate], 1,3,5-trimethyl-2,4,6-tris(3,5-di-tert-butyl- 4-hydroxybenzyl)benzene, n-octadecyl 3-(4'-hydroxy-3,5'-di-tert-butylphenyl)propionate 4,4'methylenebis(2,6-di-tert-butylphenol), 4,4'-butylidpnebis(6-tert-butyl-3-methylphenol), 2,2'-thiodiethylbis[3-(3,5-di-tert-butyl-4-hydroxyphenyl)-propionate], distearyl 3,5-di-tert-butyl-4-hydroxybenzyl phosphate, 2-tert-butyl-6-(3-tert-butyl-5-methyl-2-hydroxybenzyl)-4-methylphenyl acrylate and N,N'-hexamethylenebis(3,5-di-tert-butyl-4-hydroxyhydrocinnamide). These compounds may be used alone or in the form of a mixture of two or more of the same. Among them, 1,6-hexanediol bis [3-(3,5-di-tert-butyl-4-hydroxy-phenyl)propionate], pentaerythrityl tetrakis[3-(3,5-di-tert-butyl-4-hydroxyphenyl)propionate], triethylene glycol bis-[3-(3-tert-butyl-5-methyl-4-hydroxyphenyl) propionate] and N,N'-hexamethylenebis(3,5-di-tert-butyl-4-hydroxyhydrocinnamide) are particularly preferred.

The amount of the hindered phenolic compound in the compositions of the present invention is between 0.01 to 5 parts by weight, preferably between 0.1 to 3 parts by weight, per 100 parts by weight of the polyacetal base resin. When the amount of the second stabilizer is excessively small, little (if any) beneficial effects can be attained. On the other hand, when the second stabilizer is present in excessively large amounts, no further improvements in heat stability can be attained and, in fact, unfavorable phenomena, such as stabilizer bleeding occurs.

Known additives typically employed in thermoplastic engineering resin compositions in order to impart other desirable properties thereto may also be incorporated into the compositions of the present invention. For example, use may be made of one or more known additives such as lubricants, nucleating agents, mold release agents, antistatic agents and/or other surfactants, organic polymeric materials, as well as inorganic or organic fibrous, particulate or flaky fillers.

There is no particular limitation on the method used to prepare the compositions of the present invention. The compositions of this invention can thus easily be prepared through the use of known methods, equipment and techniques commonly used in the plastics art for producing conventional resin blend compositions. The resin compositions of the present invention can likewise be shaped by any conventional molding technique, such as extrusion, injection, compression, vacuum, blow, and foam molding techniques.

As is apparent from the foregoing description and the Examples which follow, the compositions of the present invention containing carbon-laden ethylenic carrier resin is significantly improved in terms of heat stability (particularly melt-phase stability) and are thus likely to form mold deposits even during continuous molding operations for prolonged time periods. Furthermore, as a result of this improved heat stability, significant reductions in the amount of evolved formaldehyde gas during repetitive molding (regeneration testing) as compared to conventional resin compositions which contain carbon black per se (i.e., not integrated within an ethylenic carrier polymer) can be attained which in turn contributes to significant productivity improvements.

The present invention will be described in more detail with reference to the following non-limiting Examples.

EXAMPLES

The present invention will be described in more detail with reference to the following non-limiting Examples.

The various characteristic values of the compositions tested in the Examples and Comparative Examples were determined by the following methods.

(1) Weight Loss after Heating 5 g of a sample was heated at 235° C. for 45 min to determine a weight loss after heating (ppm/min).

(2) Amount of Extracted Formalin 50 g of a sample was immersed in water and boiled at 100° C. for one hour. Formalin extracted with the hot water was then quantitatively determined.

(3) Molding Test

Pellets prepared in the Examples were diluted with a polyacetal resin (trade name: Duracon M90-02) manufactured by Polyplastics Co., Ltd. in a carbon concentration of 0.5% by weight (based on the total composition weight), and subjected to the following test.

(i) Continuous Molding Test

Injection molding machine: Nissei PS20E (manufactured by Nissei Plastic Industrial Co., Ltd.)
cylinder temperature: 200° C.
injection pressure: 750 kg/cm²
injection time: 4 sec
cooling time: 3 sec
mold temperature 30° C.

A molded article having a particular shape was continuously molded (for 24 hr.) using the above molding conditions. The formation of mold deposits was observed visually and qualitatively evaluated according to the following rankings:

0: no deposit was observed;
1: deposit was barely observed;
2: a small amount of deposit was observed;
3: a moderately large amount of deposit was observed; and
4: a very large amount of deposit was observed.

(ii) Repetitive Molding Test (Amount of Evolved Gas)

Repetitive molding (re-molding of a material which was ground after molding) was conducted by means of an injection molding machine using the above-described mixture (carbon concentration 0.5% by weight). The amount of evolved gas was then determined for the molded articles as follows:

(4) Amount of Evolved Gas

A molded article was ground into a powder and 8 grams of the resultant powder was allowed to stay in a molten state at 20° C. for 5 minutes in a melt indexer. A load was applied to the melt so that the melt flowed out. The evolved formaldehyde was collected, and the collected amount of formaldehyde was measured by the acetylacetone method and expressed in terms of the weight (ppm) of evolved formaldehyde per unit weight of the resin.

The symbols in the Tables have the following meanings:

B. Carbon Black

B1: acetylene black (integrated with polyethylene in an amount of 1.5 times by weight of the acetylene black).

B2: acetylene black (integrated with polyethylene in an amount of 1.0 time by weight of the acetylene black).

B3: furnace black (integrated with polyethylene in an amount of 1.0 time by weight that of the acetylene black).

C. Nitrogen-containing Compound

C1: melamine.
C2:

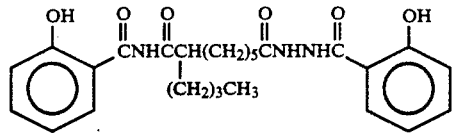

Fatty acid ester compound:
C3: glycerin monostearate.
C4: sorbitan monostearate.
Metal salt of carboxylic acid:
C: calcium 12-hydroxystearate

D. Hindered Phenolic Compound

D1: pentaerythrityl tetrakis[3-(3,5-di-tert-butyl-4-hydroxyphenyl) propionate],

D2: triethylene glycol bis[3-(3-tert-butyl-5-methyl-d-hydroxyphenyl) propionate].

Other Components

B'1: acetylene black.
B'2: furnace black.

PE: polyetylene.

as that of the Examples. The results are summarized in Tables 1 and 2.

TABLE 1

| Compsn. | | Ex. No. | | | | | | | | |
|---|---|---|---|---|---|---|---|---|---|---|
| | | 1 | 2 | 3 | 4 | 5 | 6 | 7 | 8 | 9 |
| (A) polyacetal resin | (pt. wt.) | 100 | 100 | 100 | 100 | 100 | 100 | 100 | 100 | 100 |
| (B) integrated carbon black | symbol | B1 | B1 | B1 | B1 | B1 | B1 | B2 | B3 | B3 |
| | (pt. wt.) | 34 | 34 | 34 | 34 | 34 | 14 | 25 | 25 | 25 |
| carbon black | symbol | — | — | — | — | — | — | — | — | — |
| | (pt. wt.) | | | | | | | | | |
| ethylenic polymer | symbol | — | — | — | — | — | — | — | — | — |
| | (pt. wt.) | | | | | | | | | |
| (C) compd. | symbol | C1 | C1 C3 | C1 C4 | C1 C5 | C2 C3 | C1 C5 | C1 C3 | C1 C3 | C1 C3 |
| | (pt. wt.) | 0.3 | 0.3 0.5 | 0.3 0.5 | 0.2 0.2 | 0.3 0.5 | 0.2 0.2 | 0.3 0.5 | 0.3 0.5 | 0.3 0.5 |
| (D) hindered phenolic compd. | symbol | D1 | D1 | D1 | D1 | D1 | D1 | D1 | D1 | D2 |
| | (pt. wt.) | 0.5 | 0.5 | 0.5 | 0.5 | 0.5 | 0.5 | 0.5 | 0.5 | 0.5 |
| Qualities | | | | | | | | | | |
| weight loss on heating | (ppm/min) | 100 | 70 | 60 | 150 | 90 | 120 | 65 | 70 | 73 |
| amt. of extracted formalin | (wt. %) | 0.040 | 0.020 | 0.025 | 0.035 | 0.020 | 0.030 | 0.022 | 0.020 | 0.025 |
| moldability continuous molding test | | 2 | 0 | 1 | 2 | 1 | 1 | 0 | 0 | 0 |
| repetitive regeneration 0 | (ppm) | 95 | 65 | 61 | 101 | 75 | 75 | 61 | 63 | 65 |
| molding 1st | (ppm) | 120 | 70 | 69 | 105 | 79 | 76 | 65 | 68 | 70 |
| test 2nd | (ppm) | 180 | 76 | 82 | 140 | 82 | 79 | 73 | 75 | 78 |

TABLE 2

| Compsn. | | Comp. Ex. No. | | | | | | | | |
|---|---|---|---|---|---|---|---|---|---|---|
| | | 1 | 2 | 3 | 4 | 5 | 6 | 7 | 8 | 9 |
| (A) polyacetal resin | (pt. wt.) | 100 | 100 | 100 | 100 | 100 | 100 | 100 | 100 | 100 |
| (B) integrated carbon black | symbol | — | — | — | — | — | — | — | — | — |
| | (pt. wt.) | | | | | | | | | |
| carbon black | symbol | B'1 | B'1 | B'1 | B'1 | B'1 | B'1 | B'1 | B'2 | B'2 |
| | (pt. wt.) | 11.2 | 11.2 | 13.6 | 11.2 | 11.2 | 13.6 | 5.3 | 11.2 | 12.5 |
| ethylenic polymer | symbol | — | — | PE | — | — | PE | — | — | PE |
| | (pt. wt.) | | | 20.4 | | | 20.4 | | | 12.5 |
| (C) compd. | symbol | C1 | C1 C3 | C1 C3 | C1 C4 | C1 C5 | C2 C3 | C1 C5 | C1 C3 | C1 C3 |
| | (pt. wt.) | 0.3 | 0.3 0.5 | 0.3 0.5 | 0.3 0.5 | 0.2 0.2 | 0.3 0.5 | 0.2 0.2 | 0.3 0.5 | 0.3 0.5 |
| (D) hindered phenolic compd. | symbol | D1 | D1 | D1 | D1 | D1 | D1 | D1 | D1 | D2 |
| | (pt. wt.) | 0.5 | 0.5 | 0.5 | 0.5 | 0.5 | 0.5 | 0.5 | 0.5 | 0.5 |
| Qualities | | | | | | | | | | |
| weight loss on heating | (ppm/min) | 580 | 630 | 510 | 690 | 540 | 830 | 500 | 610 | 620 |
| amt. of extracted formalin | (wt. %) | 0.053 | 0.051 | 0.059 | 0.059 | 0.054 | 0.053 | 0.052 | 0.050 | 0.054 |
| moldability continuous molding test | | 4 | 4 | 4 | 4 | 4 | 4 | 4 | 4 | 4 |
| repetitive regeneration 0 | (ppm) | 150 | 180 | 180 | 190 | 190 | 200 | 150 | 200 | 230 |
| molding 1st | (ppm) | 170 | 230 | 200 | 250 | 220 | 290 | 190 | 240 | 270 |
| test 2nd | (ppm) | 250 | 310 | 290 | 320 | 340 | 370 | 230 | 300 | 330 |

Examples 1 to 9 and Comparative Example 1 to 9

A polyacetal resin (A) (trade name: Duracon: manufactured by Polyplastics Co., Ltd ) was blended with a carbon black (B), which itself was pre-integrated within an ethylenic carrier polymer in the amounts specified in Table 1. A co-stabilization system employing various first stabilizer compounds (C) such as a nitrogen-containing compound, and a second stabilizer component in the form of a hindered phenolic compound (D) were incorporated into the composition in the proportions specified in Table 1. The components were mixed with each other and melt-kneaded by means of a double-screw extruder to prepare pellet forms of the compositions. These pellets were then subjected to the above-described evaluations. For comparison, as shown in Table 2, a composition containing an untreated (non-integrated) carbon black (the above-described B'1 and B'2) and a composition merely containing a mixture of an untreated carbon black with polyethylene (i.e. the polyethylene was not pre-impregnated with carbon black) were pelletized and evaluated i the same manner While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A melt-stable recyclable polyacetal resin molding composition comprising a blend of
   (A) 100 parts by weight of a polyacetal base resin;
   (B) a carbon black-laden ethylenic carrier resin which is present in an amount to provide between 0.1 to 30 parts by weight of carbon black, and wherein the ethylenic carrier resin is present in an amount between 0.3 to 8 times by weight of the carbon black integrated therewithin, and a co-stabilization system which comprises
   (C) between 0.01 to 5 parts by weight of at least one compound selected from nitrogen-containing compounds, fatty acid ester compounds and metal-containing compounds having a hydroxide moiety, an inorganic acid salt moiety or a carboxylic acid salt of an alkali metal or an alkaline earth metal, and (D) between 0.01 to 5 parts by weight of a hindered phenolic compound.

2. The composition according to claim 1, wherein the ethylenic polymer is polyethylene.

3. The composition according to claim 1 or 2, wherein the component (C) is a combination of a nitrogen-containing compound with a fatty acid ester compound and/or a metal-containing compound.

4. The composition according to claim 1 or 2, wherein the nitrogen-containing compound as component (C) is melamine and/or dicarboxylic acid dihydrazide.

5. The composition according to claim 1 or 2, wherein the fatty acid ester compound as the component (C) is an ester of a fatty acid selected from palmitic acid, stearic acid and behenic acid with a polyhydric alcohol selected from glycerol and sorbitan.

6. The composition according to claim 1 or 2, wherein the fatty acid ester compound as component (C) is at least one member selected from glycerin monostearate, glycerin distearate and sorbitan monostearate.

7. The composition according to claim 1 or 2, wherein the metal-containing compound as component (C) is a calcium, magnesium or lithium salt of a carboxylic acid.

8. The composition according to claim 7, wherein the carboxylic acid salt is at least one member selected from calcium stearate, calcium 12-hydroxystearate and calcium behenate.

9. The composition according to claim 1 or 2, wherein the carbon-black-laden ethylenic carrier polymer is present in an amount to yield about 3 to 15 parts by weight of carbon black.

10. A molded article which consists essentially of the composition according to claims 1 or 2.

11. A method of making a melt-stable, recyclable polyacetal molding resin composition comprising the steps of:

preblending carbon black with an ethylenic carrier polymer to form a carbon black-impregnated ethylenic polymer; and then melt-blending a polyacetal base resin with (A) said carbon black-impregnated ethylenic polymer for a time sufficient to disperse the carbon black homogeneously throughout the polyacetal base resin, and in an amount such that the carbon black is present in the composition in an amount between about 0.1 to 30 parts by weight, based on 100 parts by weight of the polyacetal base resin, and (B) a co-stabilization system which comprises (i) between 0.01 to 5 parts by weight of at least one compound selected from nitrogen-containing compounds, fatty acid ester compounds and metal-containing compounds having a hydroxide moiety, an inorganic acid salt moiety or a carboxylic acid salt of an alkali metal or an alkaline earth metal, and (ii) between 0.001 to 5 parts by weight of a hindered phenolic compound.

12. The method as in claim 11, wherein the ethylenic carrier polymer is present in an amount between 0.3 to 8 times by weight of the carbon black impregnated therein.

* * * * *